Nov. 26, 1963   R. L. BODKINS   3,111,717
INJECTION MOLDING APPARATUS
Filed Nov. 3, 1961

INVENTOR.
R. L. BODKINS
BY *Young and Quigg*
ATTORNEYS

`3,111,717`
INJECTION MOLDING APPARATUS
Roy L. Bodkins, Bartlesville, Okla., assignor to Phillips Petroleum Company, a corporation of Delaware
Filed Nov. 3, 1961, Ser. No. 149,958
8 Claims. (Cl. 18—42)

This invention relates to an injection molding apparatus. In one aspect the invention relates to a sprue cut-off valve for injection molding apparatus. In another aspect the invention relates to a method of cooling the gate to the cavity in an injection molding apparatus.

Many types of automatic or substantially automatic injection molding machines are currently in use whereby molded articles having a variety of shapes can be rapidly formed from a number of suitable moldable materials. A standard injection molding machine generally includes a hopper into which unplasticized molding composition is introduced, a heating cylinder wherein a molding composition is heated and plasticized, and an injection ram for forcing the plasticized composition from the cylinder into the cavity of a mold. To facilitate injection of the plasticized molding material into a mold cavity, the cylinder is provided with a nozzle which is adapted to be aligned within appropriate transfer passages or inlets provided in the mold assembly and connected with one or more mold cavities.

In the usual automatic injection machine commonly employed there is associated with the injection cylinder immediately beyond the nozzle two platens, one of which is normally stationary and the other which is movable. Between the platens there is disposed a mold assembly including two mold sections or dies having adjacent recesses. When the mold sections are placed together in a closed position, the plasticized molding composition from the heating cylinder is injected into the cavity of the closed mold until the cavity is filled, the injection is then stopped, the mold opened and the molded article ejected from the cavity. After ejection of the molded article the mold is again closed and the cycle repeated. A plurality of articles can be molded simultaneously by providing a number of cavities in a mold rather than a single cavity.

In many operations after the injection step has been completed the molding composition present in the transfer passages of a mold preceding a cavity hardens in the same manner as the molded article and accordingly this hardened material in the passages must be removed along with the molded article in order to permit subsequent transfer of the molding composition through the passages. Normally the hardened material in these passages, sometimes referred to as the "sprue," is attached to the molded article and requires separation from the article either by hand or automatic means after removal of the molded article from a mold.

It is an object of the invention to provide a novel injection molding apparatus.

Still another object of this invention is to provide an injection molding apparatus which will automatically sever the sprue from the molded article prior to removal of the article from the apparatus.

It is another object of the invention to provide apparatus for the automatic ejection of the severed sprue from the injection molding apparatus.

It is yet another object of the invention to provide a novel system for cooling the gate to the cavity containing the molded article.

These and other objects, aspects and advantages of the invention will be apparent to those skilled in the art in view of the disclosure, claims and drawings.

These objects are broadly accomplished in apparatus for molding a molten material which is solidified therein by apparatus comprising in combination a mold half body member containing a cavity in the meeting face, a sprue passageway in said body member for introducing a moldable material into said cavity, said sprue passageway being interrupted by a movable member within said body member containing a first fluid passageway alignable with said sprue passageway, and a second fluid passageway within said body member having an inlet and outlet in said body member, said second fluid passageway being interrupted by said movable member when in position to inject said moldable material and being alignable with said first fluid passageway for passing a fluid therethrough to eject the sprue severed by the movement of the movable member from the injection position to the sprue ejection position. Preferably, the movable member is a rotatable cylindrical member which is rotatable so as to align the fluid passageways for severing of the sprue and ejection of said sprue.

In one aspect of the invention a cooling means is provided within said rotatable means which is alignable with the gate area for cooling the gate to the cavity when said rotatable means is in position for ejecting said sprue.

In the drawings a molding die construction is illustrated in an exemplary manner and without showing many of the details of the injection molding machine which operate the various parts of the mold per se. It is not believed necessary to burden the illustration with such details since the machine with which the molding die of this invention is used is of substantially standard construction on many types of machines now in use.

In a preferred embodiment of the invention a molding die comprising the invention is mounted in an injection molding machine having mold operating members movable in a substantially horizontal direction. However it is readily conceivable that substantially all aspects of the molding die apparatus and process comprising the present invention are useful in molding machines and die constructions including operating members movable in a substantially vertical direction.

The invention is best illustrated by reference to the following drawings.

Although the invention is described with particular reference to a rotatable cylindrical member, it is within the scope of the invention to use any type of a movable, e.g. a rectangular slidable member which has a fluid passageway alignable with the sprue passageway substantially as shown. However, in such a case the ejection passageways 20, 22 would not necessarily be in the same plane. For instance, if the slidable member 12 is moved vertically with reference to the illustration of FIGURE 1, the passageway 20 would be in a plane above or below its illustrated position.

Figure 1:
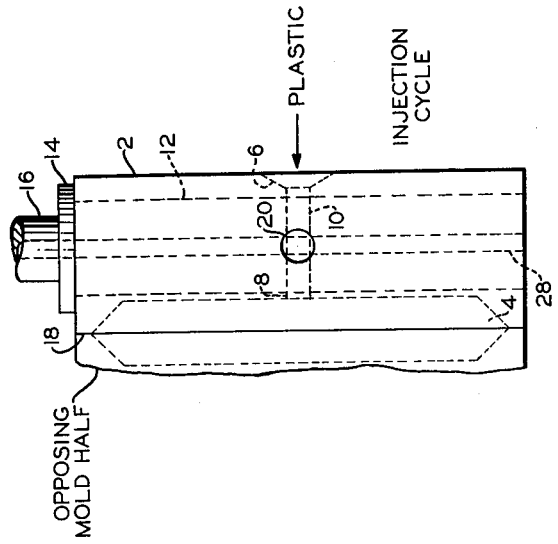
FIGURE 1 illustrates the valve in position for the injection of the plastic into the cavity.

Referring now to said drawings wherein like reference numerals are employed to denote like elements the invention will now be more fully explained. In FIGURE 1 the valve is illustrated in position for the injection of the plastic into the cavity. There is illustrated a body member 2 having a meeting face 18 containing a recess 4. At nozzle inlet 6 is provided in a face other than the meeting face for the introduction of the moldable material, e.g. polyethylene, which passes through nozzle inlet 6, valve channel 10 and gate channel 8 into the cavity 4. In the position shown valve channel 10 is in direct alignment with the channel 8 and nozzle inlet 6. Valve channel 10 is a passageway contained in rotatable cylindrical member 12 disposed within a passageway within the body member 2 transverse of the axis aligning channel 8 and inlet 6. Collar 14 and rotating means 16 provide means for positioning the rotatable member 12 so that during the injection cycle channel 10 will be properly aligned with the inlet 6 and gate 8. As will be obvious to those skilled in the art there may be an opposing mold half, represented herein symbolically, which may contain identically the same apparatus features as those shown.

Figure 2:
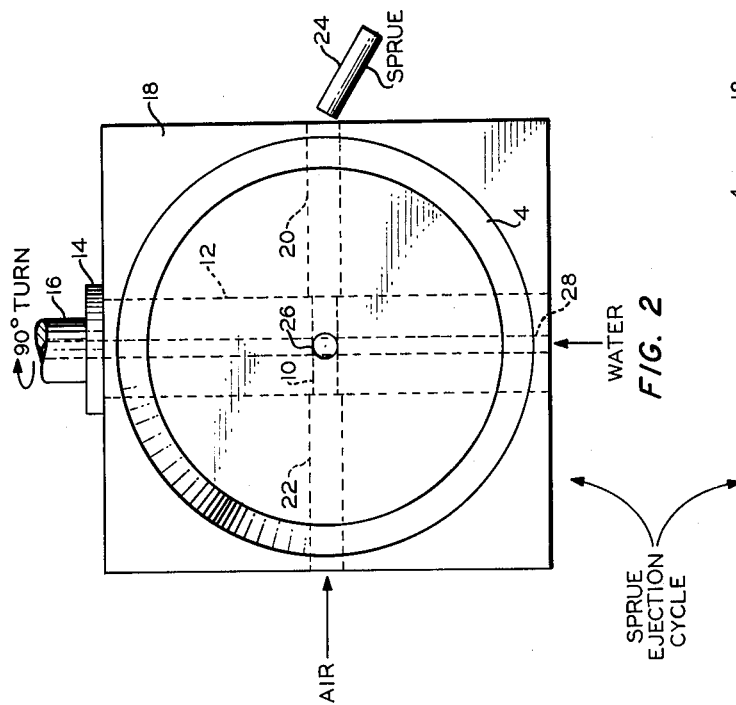
FIGURE 2 illustrates the valve in the ejection position after the cylindrical member has been rotated to sever the sprue and align the passageway in the body member with the sprue passageway for ejection of the sprue.
Figure 3:
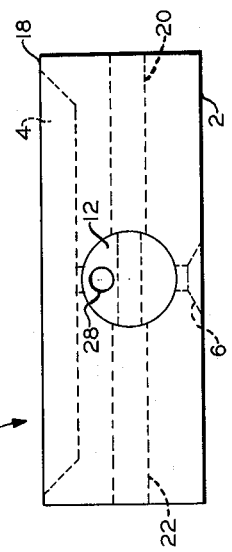
FIGURE 3 is a bottom view of FIGURE 2 and best illustrates a satisfactory position for the water cooling channel.

Referring now to FIGURE 2 the apparatus is illustrated after the moldable material has been injected into the cavity 4 and the rotatable member 12 has been rotated, such as 90°, so as to align the valve channel 10 with the fluid passageways 20 and 22 which are passageways contained within the body member 2. Although 90° is a convenient angle it will be readily apparent to those skilled in the art that any other angle may be used. When the channels are thus aligned, a fluid, such as air, is injected into passageway 22 so as to propel the sprue, which has been severed by the rotation of rotatable member 12, from channel 10 through passageway 20. The sprue 24 is discharged into a suitable receiving container not shown. Any suitable cam or other mechanism can be used for the cyclical operation of the movable member 12 to cooperate with the injection molding apparatus so as to automatically inject the moldable material, sever the sprue, automatically eject the sprue and then advance or return the movable member 12 to a position suitable for injection. As discussed hereinbefore said movable member 12 can be slidably mounted so as to move along its axis with a corresponding relocation of the fluid passageways 20, 22.

In another aspect of the invention it is possible to automatically and cyclically introduce a cooling medium directly opposite the gate channel 8. The purpose of introducing a cooling medium into this particular location is to prevent the buildup of stresses in the molded article which might otherwise occur due to the uneven cooling of the molded article in cavity 4. Since the material contained in channel 8 is the last introduced therein, it is therefore hotter than the rest of the article and unless the heat is rapidly removed may result in uneven stresses and strains within the molded article at the point of juncture. It is also obvious that the gate channel 8 can be reduced to an absolute minimum so that by the movement of the movable member 12 the sprue is completely removed so as to reduce further severing operations to a minimum. By the location of the water channel 28 in the rotatable member, such as shown in FIGURE 2, the water channel moves into position directly opposite the gate when the rotatable member is in the ejection position. Any suitable cooling medium, e.g. water, may be used. Although the channel is shown as passing completely through the rotatable member, any suitable channel inlet and outlet can be used to provide cooling medium to the gate area so long as it is moved into the gate area by the movement of the rotatable member.

As used herein and in the appended claims the term "gate" when used as a verb refers to forming an opening through a wall of the mold cavity and through which molten material enters said cavity from the channel or runner leading to the gate. The term "gate" when used as a noun refers to the terminal end of a runner channel which enters the mold cavity of the molding die.

While the invention has been described as particularly adapted for the injection molding of plastic material such as polyethylene, it is believed obvious that the invention could be employed in suitable molding apparatus for the molding of any other hardenable molten material such as metals, metal alloys, etc.

While certain examples, structures, compositions and process steps have been described for purposes of illustration the invention is not limited to these. Variations and modifications in the scope of the disclosure and the claims can readily be affected by those skilled in the art.

What I claim is:

1. In apparatus for molding a molten material which is then solidified therein, apparatus comprising, in combination, a mold half body member containing a cavity in the meeting face, a sprue passageway in said body member for introducing a moldable material into said cavity, said sprue passageway being interrupted by a movable member within said body member and adjacent said cavity containing a first fluid passageway alignable with said sprue passageway, and a second fluid passageway within said body member having an inlet and outlet in said body member, said second fluid passageway being interrupted by said movable member when in position to inject said moldable material and being alignable with said first fluid passageway for passing a fluid therethrough to eject the sprue severed at the mold face by the movement of the movable member from the injection position to the sprue ejection position.

2. The apparatus of claim 1 wherein said movable member contains cooling means adjacent to and alignable with the gate area of said sprue passageway for cooling the gate to the cavity when said movable member is in the sprue ejection position.

3. In apparatus for molding a molten material which is then solidified therein, apparatus comprising, in combination: a mold half body member containing a cavity in the meeting face, a sprue passageway in said body member for introducing a moldable material into said cavity, said sprue passageway being interrupted by a rotatable member within said body member and adjacent said cavity containing a first fluid passageway alignable with said sprue passageway, and a second fluid passageway within said body member having an inlet and outlet in said body member, said second fluid passageway being interrupted by said rotatable member when in the injection position and being alignable with said first fluid passageway for passing a fluid therethrough to eject the sprue severed at the mold face by the rotation of said rotatable member from the injection position to the sprue ejection position.

4. The apparatus of claim 3 wherein said rotatable member contains cooling means adjacent to and alignable with the gate area of said sprue passageway for cooling the gate to the cavity when said rotatable member is in the sprue ejection position.

5. In apparatus for molding articles from a molten material which is then solidified therein, apparatus comprising, a combination, a mold half body member having a meeting face, a cavity in said face, a sprue passageway having an inlet in one face and extending through said body member to said cavity for injecting a molten material into said cavity, a first passageway in said body member interrupting said sprue passageway, a rotatable cylindrical member positioned in said first passageway adjacent said cavity, a first valve channel extending through said rotatable member and so positioned as to be alignable with said sprue passageway and said cavity in the injection position, a second and third valve channels in said body member positioned so as to be communicatable with the exterior of said body member and with each other through said first valve member when said rotatable member has been rotated from the injection position to the sprue ejection position, said rotatable member severing the sprue from the molded article at the mold face when rotated from the injection position to the ejection position, said first valve channel being aligned with said second and third channels to accept and discharge the severed sprue when the rotatable member is rotated to the ejected position and means to introduce conveying means into said valve channels to eject the sprue from the body member when in the ejection position.

6. The apparatus of claim 5 wherein said rotatable means contains a passageway adjacent to and alignable with the gate area said sprue passageway for cooling the area adjacent said gate when said rotatable means is in position to eject said sprue.

7. In an injection molding apparatus the improvement comprising in combination a mold half body member having a meeting face, a cavity in said face, a nozzle seat in a face of said mold other than said plane meeting face, a gate channel in communication with said cavity and in alignment with the axis of said nozzle seat, a cylindrical passageway through said body member transverse the axis aligning said gate channel and said nozzle seat, a cylindrical rotatable member disposed within said cylindrical passageway adjacent said cavity containing a valve channel alignable with said gate channel and nozzle seat so as to permit the injection of the moldable material into said cavity in the injection position, fluid passageways through said body member transverse said cylindrical passageway and alignable with said valve channel when said rotatable member is rotated from the injection position to the ejection position, said fluid passageways having an inlet and outlet in faces of said mold half other than said meeting face, means for rotating said rotatable member so as to permit the injection of the moldable material into said cavity through said nozzle seat, valve channel and gate channel and then rotating said rotatable member so as to sever the sprue formed in said channels at the mold face and aligning said fluid passageways with said valve channel and means for introducing fluid into said fluid passageway so as to eject the sprue from said valve channel and body member through said passageways by the application of fluid pressure into the inlet of said fluid passageway, said rotatable member being then rotated into position for injection to begin a new cycle.

8. The apparatus of claim 7 wherein said rotatable member contains a cooling passageway adjacent to and alignable with said gate channel when said rotatable member is in the ejection position and means for introducing a cooling medium into said cooling channel.

References Cited in the file of this patent

UNITED STATES PATENTS

| | | |
|---|---|---|
| 2,436,122 | Rotsler | Feb. 17, 1948 |
| 2,456,423 | Jobst | Dec. 14, 1948 |
| 2,551,439 | Kovacs | May 1, 1951 |
| 2,686,934 | D'Amore | Aug. 24, 1954 |
| 2,737,686 | Harkenrider | Mar. 13, 1956 |
| 2,842,798 | Paschold | July 15, 1958 |
| 2,923,031 | Collion | Feb. 2, 1960 |
| 2,988,779 | Barton et al. | June 20, 1961 |

FOREIGN PATENTS

| | | |
|---|---|---|
| 1,246,478 | France | Oct. 10, 1960 |